Patented Dec. 12, 1922.

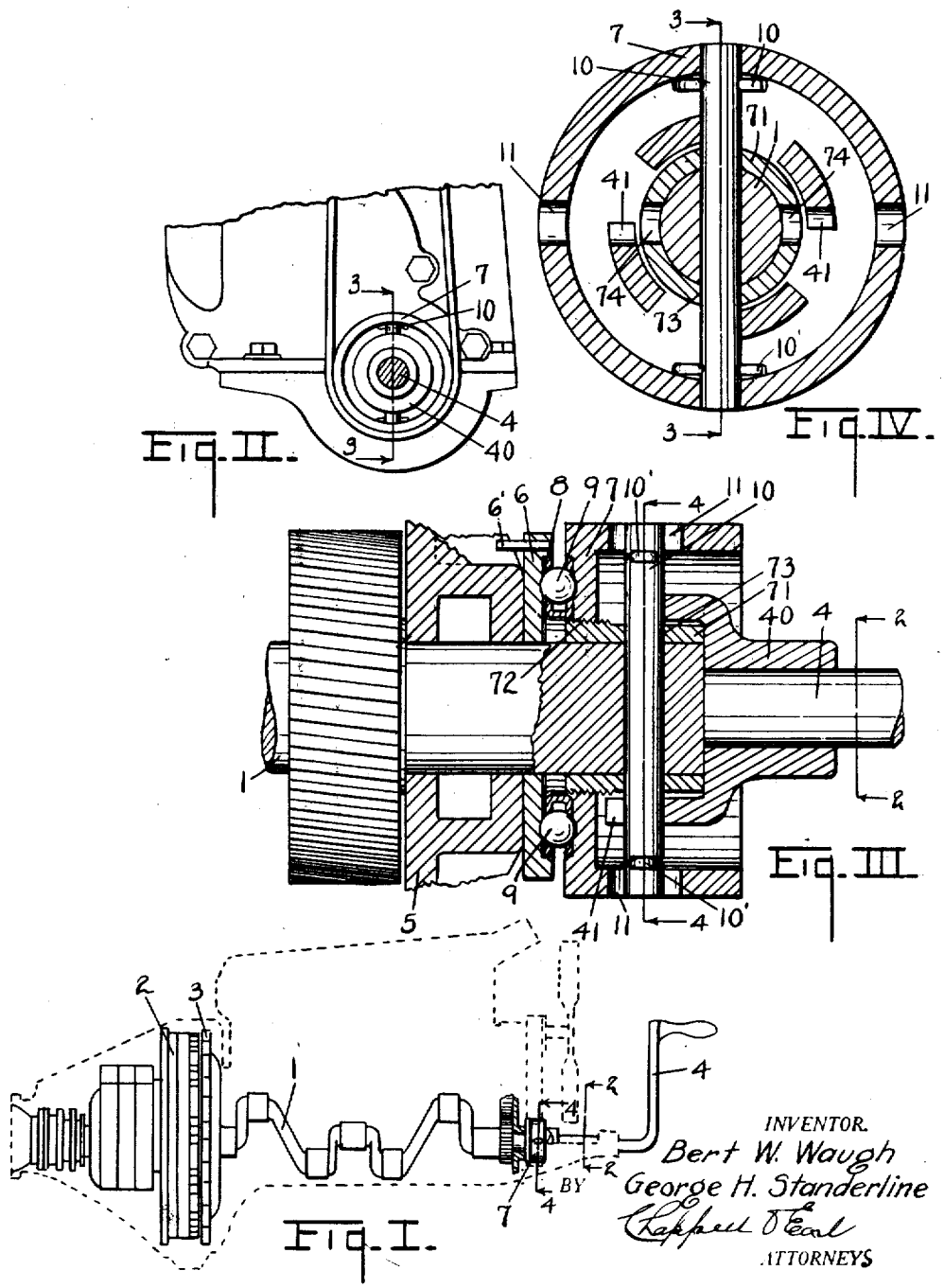

1,438,415

UNITED STATES PATENT OFFICE.

BERT. W. WAUGH, OF JONES, AND GEORGE H. STANDERLINE, OF COREY, MICHIGAN.

THRUST-BEARING MEANS FOR CRANK SHAFTS.

Application filed November 7, 1921. Serial No. 513,506.

*To all whom it may concern:*

Be it known that we, BERT. W. WAUGH and GEORGE H. STANDERLINE, citizens of the United States, residing at Jones, in the county of Cass and Corey, in the county of Cass, respectively, State of Michigan, have invented certain new and useful Improvements in Thrust-Bearing Means for Crank Shafts, of which the following is a specification.

This invention relates to improvements in thrust bearing means for automobile crank shafts.

The object of our invention is to provide a fine and accurate adjustment for such crank shafts especially where the generator is carried by the fly wheel.

Further objects, and objects pertaining to details and economies of construction and operation will definitely appear from the detailed description to follow.

We accomplish the objects of our invention by the devices and means described in the following specification. The invention is clearly defined and pointed out in the claims.

A structure which is a preferred embodiment of our invention is clearly illustrated in the accompanying drawing forming a part of this specification, in which:

Fig. I is a detail diagrammatic view of the crank, crank shaft, and generator means of a Ford automobile with our invention incorporated therein, the relations and details of the engine housing and fan being indicated by dotted lines.

Fig. II is an enlarged detail transverse sectional elevation view taken on line 2—2 of Fig. I.

Fig. III is an enlarged detail longitudinal sectional view on line 3—3 of Figs. II and IV.

Fig. IV is an enlarged detail transverse sectional view on line 4—4 of Fig. III.

In the drawings the sectional views are taken looking in the direction of the little arrows at the ends of the section lines and similar numerals of reference refer to similar parts throughout the several views.

We will consider the numbered parts of the drawings by their numerals. 1 is the crank shaft of an automobile. 2 is the fly wheel carrying the armature and 3 is the stationary field facing the same. 4 is the crank which bears the crank ratchet 40 with its teeth 41 for use in detachably engaging the crank shaft in starting the engine where that is done by hand.

5 is the frame through which the forward end of the crank shaft is journaled. 6 is the fixed thrust bearing disk held from rotation by pin or projection 6'. This cooperates with the face of the fan wheel 7, ball races being formed within the same and a ball spacer and carrier 8 being provided with the balls 9 of the ball bearing.

The fan wheel 7 is adjustable on hub 71 which is screw threaded on its periphery at 72 to receive and support the same. The hub 71 is fixed upon the shaft 1 by the cross pin 10 disposed through perforations 73 or 74 therethrough. The holes 73, 74 are at right angles to each other through the said hub and are in the same transverse plane.

The cross pin 10 extends into the elongated slotted holes 11 in the rim of the fan pulley 7 and is retained by cotter pins 10' disposed within the rim of the said pulley.

To secure the best effects from the generator or magneto in the fly wheel, a very close adjustment of the parts is necessary. This is accomplished by the structure here shown. The cross pin 10 can be very readily removed by withdrawing the cotter pins 10' therefrom. The hub 71 can then be turned at right angles if desired to the position which it occupies, which, of course, gives a slightly advanced or retracted position to the screw carried thereby. The cross pin 10 fits snugly in the holes 73, 74 therethrough. When the cross pin is removed the pulley 7 can be turned to any position desired by quarter turn steps and its adjustment can be effected by a very small fraction of the advance of the thread upon the screw and all parts are then effectively locked in position by inserting the cross pin. The adjustment of the pulley back and forth is permitted by the slotted holes 11 which are engaged by the outer ends of the pin 10. The adjustment very readily takes up any wear and permits the close adjustment. About one thirty-second of an inch clearance is required between the field and armature of the generator.

The pin 10 made use of is, of course, the cross pin which is engaged by the crank ratchet 40 and it still continues to function in that behalf so that the adjustment is effected in a very simple and effective manner. It may be accomplished by the addition of very simple parts to the Ford car already in use. Of course, this structure can be built when the car is originally built.

It is desired to claim the invention specifically as well as broadly as pointed out in the appended claims.

Having thus described our invention what we claim as new and desire to secure by Letters Patent is:

1. In a thrust bearing means for an automobile crank shaft, the combination with the crank shaft of the engine, a thrust ball race disposed on the said frame, an adjustable pulley with screw thread at the center and thrust ball race on the face thereof and sets of longitudinal slots in the rim thereof, an externally screw threaded hub on the said crank shaft with cross holes therethrough, a cross pin for securing the said hub in fixed relation to the said crank shaft and for engaging the longitudinal slots in said pulley to hold it against rotation when adjusted on the said screw thread.

2. In a thrust bearing means for a crank shaft, the combination of a shaft with hole therethrough for cross pin, a shaft journal bearing, a fixed thrust bearing member with ball race associated with said journal bearing, an adjustable opposed thrust bearing member carried by the said shaft with one or more cross pin cross holes therethrough, an external screw threaded adjustable hub for the said adjustable thrust bearing member having one or more cross pin cross holes, suitable bearing balls therebetween, and a cross pin for holding said hub and adjustable member in adjusted relation on said shaft, coacting as specified.

3. In a thrust bearing means for a crank shaft, the combination of a shaft with hole therethrough for cross pin, a shaft journal bearing, a fixed thrust bearing member with ball race associated with said journal bearing, an adjustable opposed thrust bearing member carried by the said shaft with cross pin cross hole therethrough, an external screw threaded adjustable hub for the said adjustable thrust bearing member having cross pin cross hole, suitable bearing balls therebetween, and a cross pin for holding said hub and adjustable member in adjusted relation on said shaft, coacting as specified.

4. In a thrust bearing means for crank shaft, the combination of a shaft with hole therethrough for cross pin, a shaft journal bearing, a fixed thrust bearing member with ball race associated with said journal bearing, an adjustable opposed thrust bearing member carried by the said shaft with one or more cross pin cross holes therethrough, an external screw threaded adjustable hub for the said adjustable thrust bearing member having one or more cross pin holes, and a cross pin for holding said hub and adjustable member in adjusted relation on said shaft, coacting as specified.

5. In a thrust bearing means for a crank shaft, the combination of a shaft with hole therethrough for cross pin, a shaft journal bearing, a fixed thrust bearing member with ball race associated with said journal bearing, an adjustable opposed thrust bearing member carried by the said shaft with cross pin cross hole therethrough, an external screw threaded adjustable hub for the said adjustable thrust bearing member having cross pin cross hole, and a cross pin for holding said hub and adjustable member in adjusted relation on said shaft, coacting as specified.

In witness whereof, we have hereunto set our hands and seals.

BERT. W. WAUGH. [L. S.]
GEORGE H. STANDERLINE. [L. S.]